(12) United States Patent
Yu et al.

(10) Patent No.: US 10,376,873 B2
(45) Date of Patent: Aug. 13, 2019

(54) METHOD OF PREPARING HIGH ACTIVITY HYDROTREATING CATALYSTS

(71) Applicant: Advanced Refining Technologies LLC, Columbia, MD (US)

(72) Inventors: Xianghua Yu, Lisle, IL (US); Shuguang Zhang, Wilmette, IL (US); Gill M. Malick, Orland Park, IL (US); Bruno Nesci, Oak Lawn, IL (US); Henry Saternus, Chicago, IL (US); Jifei Jia, El Cernto, CA (US); Cecelia Radlowski, Riverside, IL (US); Theodorus Ludovicus Michael Maesen, Lafayette, CA (US); Colleen T. Miedona, Monee, IL (US)

(73) Assignee: Advanced Refining Technologies LLC, Columbia, MD (US)

( * ) Notice: Subject to any disclaimer, the term of this patent is extended or adjusted under 35 U.S.C. 154(b) by 162 days.

(21) Appl. No.: 14/261,341

(22) Filed: Apr. 24, 2014

(65) Prior Publication Data

US 2015/0306578 A1    Oct. 29, 2015

(51) Int. Cl.

| | | |
|---|---|---|
| B01J 23/00 | (2006.01) | |
| B01J 37/20 | (2006.01) | |
| B01J 37/02 | (2006.01) | |
| B01J 23/85 | (2006.01) | |
| B01J 27/188 | (2006.01) | |
| B01J 27/19 | (2006.01) | |
| C10G 45/08 | (2006.01) | |
| B01J 37/08 | (2006.01) | |
| B01J 35/10 | (2006.01) | |

(52) U.S. Cl.
CPC ............ *B01J 37/20* (2013.01); *B01J 23/85* (2013.01); *B01J 27/188* (2013.01); *B01J 27/19* (2013.01); *B01J 37/0203* (2013.01); *B01J 37/0213* (2013.01); *C10G 45/08* (2013.01); *B01J 35/1019* (2013.01); *B01J 35/1042* (2013.01); *B01J 37/084* (2013.01); *B01J 37/086* (2013.01)

(58) Field of Classification Search
None
See application file for complete search history.

(56) References Cited

U.S. PATENT DOCUMENTS

| | | | |
|---|---|---|---|
| 4,120,826 A | 10/1978 | Ebel et al. | |
| 7,538,066 B2 | 5/2009 | Soled et al. | |
| 7,605,107 B2 | 10/2009 | Soled et al. | |
| 7,718,564 B2 | 5/2010 | Dakka et al. | |
| 7,795,168 B2 | 9/2010 | Toba et al. | |
| 7,956,000 B2 | 6/2011 | Jansen et al. | |
| 2009/0258780 A1 | 10/2009 | Toba et al. | |
| 2009/0298677 A1* | 12/2009 | Radlowski et al. | .......... 502/167 |
| 2011/0294656 A1 | 12/2011 | Soled et al. | |

FOREIGN PATENT DOCUMENTS

| | | | |
|---|---|---|---|
| CN | 1769376 A | 5/2006 | |
| CN | 1769383 A | 5/2006 | |
| JP | 2005000873 | 1/2005 | |
| JP | 2005000873 A | 1/2005 | |
| JP | 2005013930 A | 1/2005 | |
| JP | 2013528489 A | 7/2013 | |
| JP | 2016203074 A | 12/2016 | |
| WO | 2006093170 A1 | 9/2006 | |
| WO | 2007070394 | 6/2007 | |
| WO | WO 2007/070394 | * 6/2007 | .............. B01J 23/00 |

OTHER PUBLICATIONS

International Union of Pure and Applied Chemistry "Compendium of Chemical Terminology Gold Book", Version 2.3.3, Feb. 24, 2014.*
CN 1769376 A, a machine translation (Year: 2006).*
PCT International Search Report, PCT/US2015/027017, dated Jul. 7, 2015.
T. Fujikawa, M. Kato, H. Kimura, K. Kiriyama, M. Hashimoto and N. Nakajima "Development of Highly Active Co—Mo Catalysts with Phosphorus and Citric Acid for Ultra-deep Desulfurization of Diesel Fractions (Part 1) Preparation and Performance of Catalysts" J. Jpn. Petrol. Inst. 2005, 48, 106-113.
Singapore Search Report for Application No. 11201608544Q, dated Oct. 5, 2017.
"X-ray Photoelectron Spectroscopy", downloaded Mar. 21, 2019 from https://en.wikipedia.org/w/index.php?title=X-ray_photoelectron_spectroscopy&oldid=8831329, 15 pages.
Boscoboinik, J.A., "X-Ray Photoelectron Spectroscopy for Chemical Analysis", Selected Topics in Materials Science, Presented at Columbia University by J.A. Boscoboinik (Oct. 14. 2015), 55 pages.
Search Report from Corresponding Japanese Application.

* cited by examiner

*Primary Examiner* — Yun Qian

(74) *Attorney, Agent, or Firm* — Lerner, David, Littenberg, Krumholz & Mentlik, LLP

(57) ABSTRACT

This disclosure relates to supported multi-metallic catalysts for use in the hydrotreating of hydrocarbon feeds, as well as a method for preparing such catalysts. The catalysts are prepared from a catalyst precursor comprised of at least one Group VIB metal, at least one Group VIII metal and an organic acid. The catalyst precursor is thermally treated to partially decompose the organic acid, then sulfided. The catalysts have a high carbon-as-carboxyl to total carbon ratio ($C_{carboxy}/C_{total}$) as a result of a unique post-metal calcination method employed during the manufacture of the catalyst.

7 Claims, No Drawings

METHOD OF PREPARING HIGH ACTIVITY HYDROTREATING CATALYSTS

TECHNICAL FIELD

This disclosure relates to supported multi-metallic catalysts for use in the hydrotreating of hydrocarbon feedstocks, as well as a method for preparing such catalysts. The catalysts are prepared from a catalyst precursor comprised of at least one Group VIB metal, at least one Group VIII metal and an organic acid. The catalyst precursor is thermally treated to partially decompose the organic acid and then sulfided. The catalysts have a high carbon-as-carboxyl to total carbon ratio ($C_{carboxy}/C_{total}$) as a result of a unique post-metal calcination method employed during the manufacture of the catalyst.

BACKGROUND

Increasing regulatory and operational pressure has resulted in the need for hydrocarbons that have low sulfur levels and nitrogen levels. Hydrotreating processes are used by petroleum refiners to remove heteroatoms, such as sulfur and nitrogen, from hydrocarbon streams such as naphtha, kerosene, diesel, gas oil, vacuum gas oil (VGO), and reduced crude.

Hydrotreating is generally accomplished by contacting a hydrocarbon feedstock in a hydrotreating reaction vessel, or zone, with a suitable hydrotreating catalyst under hydrotreating conditions of elevated temperature and pressure in the presence of a hydrogen-containing treat gas to yield a product having the desired level of sulfur and/or nitrogen.

Conventional hydrotreating catalysts generally contain a Group VIB metal with one or more Group VIII metals as promoters on a refractory support, such as alumina. Hydrotreating catalysts that are particularly suitable for hydrodesulfurization (HDS), as well as hydrodenitrogenation (HDN), generally contain molybdenum or tungsten on alumina promoted with a metal such as cobalt, nickel, iron, or a combination thereof. Cobalt promoted molybdenum on alumina catalysts are most widely used when the limiting specifications are hydrodesulfurization, while nickel promoted molybdenum on alumina catalysts are the most widely used for hydrodenitrogenation, partial aromatic saturation, as well as hydrodesulfurization.

There is a continuing need for ever-more reactive and effective catalysts for removing heteroatoms, such as nitrogen and sulfur from hydrocarbon streams.

SUMMARY

In one aspect, there is provided a method for preparing a catalyst composition suitable for hydrotreating hydrocarbon feedstocks, the method comprising: (a) impregnating an inorganic catalyst support with an aqueous solution containing (i) a salt of a Group VIB metal selected from Mo and W, (ii) a salt of a Group VIII metal selected from Co and Ni, and (iii) an organic acid; (b) drying the impregnated catalyst support, thereby resulting in a metal-organic component on a dried catalyst precursor; (c) calcining the dried catalyst precursor in an oxygen-containing atmosphere for a time and temperature sufficient to oxidize some but not all of the organic portion of the metal-organic component, thereby resulting in a partially oxidized catalyst precursor having (i) a loss-on-ignition of greater than 1 to 20 wt. % and (ii) a carbon-as-carboxyl to total residual carbon ratio ($C_{carboxy}/C_{total}$) of at least 0.10 as determined by X-ray photoelectron spectroscopy; and (d) sulfiding the partially oxidized catalyst precursor at sulfiding conditions in the presence of a sulfiding agent, thereby resulting in a sulfided catalyst composition.

In another aspect, there is provided a catalyst composition comprising: (a) an inorganic catalyst support; and (b) a partially oxidized metal-organic component; wherein the catalyst composition has (i) a loss-on-ignition of greater than 1 to 20 wt. % and (ii) a carbon-as-carboxyl to total residual carbon ratio ($C_{carboxy}/C_{total}$) of at least 0.10 as determined by X-ray photoelectron spectroscopy.

In yet another aspect, there is provided a process for hydrotreating a hydrocarbon feedstock, comprising: contacting the feedstock with a hydrotreating catalyst under hydrotreating conditions to produce a hydrotreated effluent, wherein the hydrotreating catalyst comprises: (a) an inorganic catalyst support; and (b) a partially oxidized metal-organic component; wherein the catalyst has (i) a loss-on-ignition of greater than 1 to 20 wt. % and (ii) a carbon-as-carboxyl to total residual carbon ratio ($C_{carboxy}/C_{total}$) of at least 0.10 as determined by X-ray photoelectron spectroscopy.

DETAILED DESCRIPTION

The following terms will be used throughout the specification and will have the following meanings unless otherwise indicated.

The term "hydrotreating" refers to a catalytic process, usually carried out in the presence of free hydrogen, in which the primary purpose when used to process hydrocarbon feedstocks is the removal of various metal contaminants (e.g., arsenic), heteroatoms (e.g., sulfur, nitrogen and oxygen), and aromatics from the feedstock. Generally, in hydrotreating operations cracking of the hydrocarbon molecules (i.e., breaking the larger hydrocarbon molecules into smaller hydrocarbon molecules) is minimized. For the purpose of this discussion, the term hydrotreating refers to a hydroprocessing operation in which the conversion is 20% or less, where the extent of "conversion" relates to the percentage of the feedstock boiling above a reference temperature (e.g., 371° C.), which is converted to products boiling below the reference temperature.

The term "organic acid" refers to a molecular entity containing at least one carboxylic acid functional group, either in the non-ionized form (e.g., —COOH), in the ionized form (e.g., —COO$^-$), or salts thereof.

The term "catalyst precursor" refers to a catalyst in unsulfided form. Use of this expression however does not exclude the fact that the unsulfided form of the catalyst also has catalytic properties.

The term "bulk dry weight" refers to the weight of a material after calcination at elevated temperature of over 1000° C. for 30 minutes.

As used herein, the numbering scheme for the Periodic Table Groups is as disclosed in *Chem. Eng. News,* 63(5), 27 (1985).

In general, hydrotreating catalysts are composed of a support having deposited thereon a Group VIB metal component and a Group VIII metal component. The most commonly employed Group VIB metals are molybdenum and tungsten, while cobalt and nickel are the conventional Group VIII metals. A promoter such as phosphorus can also be present in the catalyst.

Suitable support materials for the catalyst of the present disclosure include porous inorganic refractory materials such as alumina, silica, silicon carbide, amorphous and crystalline silica-aluminas, silica-magnesias, aluminophosphates, boria, titania, zirconia, and the like, as well as mixtures and cogels thereof. Preferred supports include silica, alumina, alumina-silica, and the crystalline silica-aluminas, particularly those materials classified as clays or zeolitic materials. More preferred support materials for purposes of this disclosure include alumina, silica, and alumina-silica, particularly either alumina or silica.

Suitable Group VIB metals for the catalyst of the present disclosure include chromium (Cr), molybdenum (Mo), and tungsten (W). Preferably, the Group VIB metal is selected from Mo and W, more preferably the Group VIB metal is Mo. The Group VIB metal component can be an oxide, an oxo acid, or an ammonium salt of an oxo or polyoxo anion. The amount of the Group VIB metal component employed in the catalyst is generally from 5 to 50 wt. % (e.g., from 10 to 40 wt. %, or from 15 to 30 wt. %), based on the bulk dry weight of the catalyst, calculated as the metal oxide.

Suitable Group VIII metals for the catalyst of the present disclosure include the non-noble metals iron (Fe), cobalt (Co) and nickel (Ni) and the noble metals palladium (Pd) and platinum (Pt). Preferably, the Group VIII metal is a non-noble metal, more preferably the Group VIII metal is selected from Co and Ni. The Group VIII metal component is usually an oxide, hydroxide or salt, preferably a salt. The amount of the Group VIII metal component in the catalyst of the present disclosure is generally from 1 to 20 wt. % (e.g., from 2 to 10 wt. %), based on the bulk dry weight of the catalyst, calculated as the metal oxide.

The total amount of metal oxide material in the catalyst of the present disclosure is from 1 to 50 wt. %, based on the bulk dry weight of the catalyst. The amount of Group VIII and Group VIB metals can be determined via atomic absorption spectroscopy (AAS), energy dispersive X-ray analysis (EDX), inductively coupled plasma mass spectrometry (ICP-MS) and/or X-ray fluorescence (XRF). Exemplary metal combinations include Co—Mo, Co—W, Co—Ni—Mo, Co—Ni—W, Ni—Mo, Ni—W, and Ni—Mo—W.

The hydrotreating catalyst of the present disclosure can contain a phosphorus component as a promoter. The presence of phosphorus in the catalyst can improve hydrodenitrogenation activity. When present, the amount of phosphorus compound employed in the catalyst is generally from 1 to 10 wt. % (e.g., from 5 to 10 wt. %), based on the bulk dry weight of the catalyst, calculated as $P_2O_5$. Phosphorus can be incorporated into the catalyst in any suitable manner by contacting the catalyst during any one of its formative stages with an appropriate quantity of a phosphorus-containing acidic component, e.g., metaphosphoric acid, pyrophosphoric acid, phosphorous acid, orthophosphoric acid, triphosphoric acid, tetraphosphoric acid, or precursors of acids of phosphorus, such as ammonium hydrogen phosphates (mono-ammonium di-hydrogen phosphate, di-ammonium mono-hydrogen phosphate, tri-ammonium phosphate).

In general, processes for preparing conventional hydrotreating catalysts are characterized in that a support material is composited with metal components, for example by impregnation, after which the composite is calcined to convert the metal components into their oxides. Before being used in hydrotreating, the catalysts are generally pre-sulfided to convert the metals into their sulfides. The hydrotreating catalyst of the present disclosure is prepared by depositing or forming a metal-organic component in or on a support material and then partially decomposing the complex to produce a catalyst precursor composition. The catalyst precursor is converted to the resulting catalyst by sulfiding using conventional sulfiding techniques.

The metal-organic component that is used to form the catalyst comprises at least one organic acid and at least one catalytically active metal. The organic acid can be any organic acid that is capable of forming an organic complex with one or more catalytically active metals. Such organic compounds are well known in the art of transition metal chemistry and include organic mono-dentate, bi-dentate, and poly-dentate ligands. The organic acid is hypothesized to assist in producing an effective dispersion of metals throughout the support. Hydroxycarboxylic acids are an exemplary class of organic acids. Hydroxycarboxylic acids contain one or more carboxyl groups and one or more hydroxyl groups. Non-limiting examples of suitable hydroxycarboxylic acids include glycolic acid, lactic acid, glyceric acid, gluconic acid, malic acid, tartaric acid, mucic acid, and citric acid. Most preferred of hydroxycarboxylic acids are lactic acid, malic acid, tartaric acid, and citric acid.

The organic acid and the Group VIB and Group VIII metals can be loaded onto the support by any suitable conventional technique, such as impregnation by incipient wetness, by adsorption from excess impregnating medium, by ion exchange, or the like, or combinations thereof. The typical impregnation route is by incipient wetness. The organic acid and Group VIB and Group VIII metals can be loaded onto the support simultaneously or sequentially in no particular order. The amount of the organic acid to be loaded onto the support material is typically from 0.05 to 5 molar times (e.g., from 0.1 to 4, from 0.25 to 3, from 0.5 to 2, or from 0.5 to 1.5 molar times) of the number of total number of moles of the metals of Group VIB and Group VIII.

The impregnated support can then be dried, e.g., by conventional drying techniques (for example at a temperature of about 100° C.) until substantially all the water is driven off (e.g., for from 2 to 6 hours).

After deposition and/or formation of the metal-organic component in or on the support, the organic portion of the metal-organic component is partially oxidized, or decomposed, by calcination to form a partially oxidized catalyst precursor having at least some residual carbon content. By "partially oxidized" it is meant a thermal treatment process applied to the impregnated support to bring about a partial, but not complete, thermal decomposition of the organic portion of the metal-organic complex. The calcination process normally takes place at temperatures below the melting point of the support, and is done under an oxygen-containing atmosphere. In an embodiment, the partial calcination is carried out at a temperature of 350° C. to 500° C. (e.g., from 350° C. to 450° C., from 360° C. to 500° C., or from 360° C. to 500° C.) for a period of from 1 minute to 1 hour (e.g., from 5 minutes to 1 hour, from 5 to 30 minutes, or from 5 to 15 minutes). The dried impregnated support can be calcined in, for example, a furnace such as a rotary kiln, box furnace, belt dryer or the like.

One criterion for establishing that a suitable hydrotreating catalyst has been obtained is to measure the weight percent loss-on-ignition (LOI) of the partially oxidized catalyst precursor. LOI is a measure of the total volatiles present in the sample, essentially water and the organic acid. The LOI test is conducted by subjecting a sample to an oxygen-containing atmosphere for 1 hour at 1020° F. (549° C.), thereby oxidizing or decomposing the organic matter or driving off all residual moisture in the catalyst. The impregnated support is calcined to a selected loss-on-ignition (LOI) at 1020° F. (549° C.) of greater than 1 to 20 wt. % (e.g., greater than 1 to 10 wt. %, greater than 1 to 9 wt. %, greater than 1 to 8 wt. %, greater than 1 to 7 wt. %, greater than 1 to 6 wt. %, greater than 1 to 5 wt. %, from 2 to 20 wt. %, from 2 to 10 wt. %, from 2 to 9 wt. %, from 2 to 8 wt. %, from 2 to 7 wt. %, from 2 to 6 wt. %, from 2 to 5 wt. %, from 3 to 20 wt. %, from 3 to 10 wt. %, from 3 to 9 wt. %, from 3 to 8 wt. %, from 3 to 7 wt. %, from 3 to 6 wt. %, or from 3 to 5 wt. %, from 4 to 20 wt. %, from 4 to 10 wt. %, from 5 to 20 wt. %, or from 5 to 10 wt. %).

Another criterion for establishing that a suitable hydrotreating catalyst has been obtained is to measure the ratio of carbon-as-carboxy to total residual carbon ($C_{carboxy}/C_{total}$) of the partially oxidized catalyst precursor. Enhanced HDS/HDN activity is observed when the $C_{carboxy}/C_{total}$ ratio of the partially oxidized catalyst precursor is at least 0.10 (e.g., from 0.10 to 0.50, from 0.10 to 0.45, from 0.10 to 0.40, from 0.10 to 0.35, from 0.10 to 0.30, from 0.10 to 0.25, at least 15, from 0.15 to 0.50, from 0.15 to 0.45, from 0.15 to 0.40, from 0.15 to 0.35, or from 0.15 to 0.25). By "$C_{carboxy}/C_{total}$ ratio" herein it is meant the ratio as determined X-ray photoelectron spectroscopy (XPS).

The XPS data presented herein were collected by standard techniques. Powders were mounted on double-sticky tape on the sample plate for introduction into the analysis vacuum chamber. The XPS spectra were collected using a monochromatized Al Kα X-ray source on a PHI Quantera XPS Scanning Microprobe. Standard charge neutralization procedures (using both low kinetic energy electrons and positive Ar ions) were used to control charging during characterization. Data were collected at sufficiently high spectral resolution (1.0 eV resolution at a minimum) to allow deconvolution of the C 1s photoelectron peak. Standard data reduction procedures were used. The average peak position for the $C_{carboxy}$ component is 289.4 eV, after correcting the hydrocarbon peak position to 284.6 eV in accordance with standard XPS data handling procedures. $C_{total}$ is the sum of the individual carbon-containing components (e.g., hydrocarbon, alcohol/ether and carboxy).

The catalyst precursor is converted to the resulting catalyst by a sulfidation step (treatment) whereby the metal components are converted to their sulfides. In the context of the present disclosure, the phrases "sulfiding step" and "sulfidation step" are meant to include any process step in which a sulfur-containing compound is added to the catalyst composition and in which at least a portion of the metal components present in the catalyst is converted into the sulfidic form, either directly or after an activation treatment with hydrogen. Suitable sulfidation processes are known in the art. The sulfidation step can take place ex situ to the reactor in which the catalyst is to be used in hydrotreating hydrocarbon feeds, in situ, or in a combination of ex situ and in situ to the reactor.

Ex situ sulfidation processes take place outside the reactor in which the catalyst is to be used in hydrotreating hydrocarbon feeds. In such a process, the catalyst is contacted with a sulfur compound, e.g., a polysulfide or elemental sulfur, outside the reactor and, if necessary, dried. In a second step, the material is treated with hydrogen gas at elevated temperature in the reactor, optionally in the presence of a feed, to activate the catalyst, i.e., to bring the catalyst into the sulfided state.

In situ sulfidation processes take place in the reactor in which the catalyst is to be used in hydrotreating hydrocarbon feeds. Here, the catalyst is contacted in the reactor at elevated temperature with a hydrogen gas stream mixed with a sulfiding agent, such as hydrogen sulfide or a compound which under the prevailing conditions is decomposable into hydrogen sulfide. It is also possible to use a hydrogen gas stream combined with a hydrocarbon feed comprising a sulfur compound which under the prevailing conditions is decomposable into hydrogen sulfide. In the latter case, it is possible to sulfide the catalyst by contacting it with a hydrocarbon feed comprising an added sulfiding agent (spiked hydrocarbon feed), and it is also possible to use a sulfur-containing hydrocarbon feed without any added sulfiding agent, since the sulfur components present in the feed will be converted into hydrogen sulfide in the presence of the catalyst. Combinations of the various sulfiding techniques can also be applied. The use of a spiked hydrocarbon feed can be preferred.

The catalyst disclosed herein is employed in the conventional manner in the form of, for example, spheres or extrudates. Examples of suitable types of extrudates have been disclosed in the literature (see, e.g., U.S. Pat. No. 4,028,227). Highly suitable for use herein are cylindrical particles (which can be hollow or not) as well as symmetrical and asymmetrical polylobed particles (2, 3 or 4 lobes).

The catalyst disclosed herein can be used in the hydrotreating of a wide range of hydrocarbon feedstocks to effect one or more of hydrodesulfurization, hydrodenitrogenation, hydrodemetallization, and hydrodearomatization. In a hydrotreating process, a hydrocarbon feedstream is contacted with a catalyst in a reaction zone operated under effective hydrotreating conditions.

The catalyst disclosed herein can be used in any one fixed-bed, fluidized-bed and moving bed reaction systems. Adoption of a fixed bed, however, is preferred from the apparatus or operation standpoint. Further, it is possible to achieve high desulfurization and denitrogenation levels by conducting hydrotreatment in plural, that is, two or more reactors connected together.

Examples of suitable hydrocarbon feedstocks include those obtained or derived from crude petroleum oil, from tar sands, from coal liquefaction, from shale oil and from hydrocarbon synthesis, such as reduced crudes, hydrockrackates, raffinates, hydrotreated oils, atmospheric and vacuum gas oils, coker gas oils, atmospheric and vacuum resids, deasphalted oils, dewaxed oils, slack waxes, Fischer-Tropsch waxes and mixtures thereof. Suitable feedstocks range from relatively light distillate fractions up to heavy feedstocks, such as gas oils, lube oils and resids. Non-limiting examples of light distillate feedstocks include naphtha (typical boiling range of from 25° C. to 210° C.), diesel (typical boiling range of from 150° C. to 400° C.), kerosene or jet fuel (typical boiling range of from 150° C. to 250° C.) and the like. Non-limiting examples of heavy feedstocks include vacuum (or heavy) gas oils (typical boiling range of from 315° C. to 610° C.), raffinates, lube oils, cycle oils, waxy oils and the like. Preferred hydrocarbon feedstocks have a boiling range of from 150° C. to 650° C., e.g., from 150° C. to 450° C.

Hydrocarbon feedstocks suitable for treatment with the present invention include, among other things, nitrogen and sulfur contaminants. The nitrogen content of such feeds can range from 50 to 4000 ppm nitrogen (e.g., from 500 to 2000 ppm nitrogen), based on the weight of the hydrocarbon feedstock. The nitrogen can appear as both basic and non-basic nitrogen species. Non-limiting examples of basic nitrogen species can include quinolines and substituted quinolines, and non-limiting examples of non-basic nitrogen species can include carbazoles and substituted carbazoles. The sulfur content of the hydrocarbon feedstock can range from 50 to 40,000 ppm sulfur (e.g., from 5000 to 30,000 ppm sulfur), based on the weight of the hydrocarbon feedstream. The sulfur will usually be present as organically bound sulfur compounds such as aliphatic, naphthenic, and aromatic mercaptans, sulfides, di- and polysulfides and the like. Other organically bound sulfur compounds include the class of heterocyclic sulfur compounds such as thiophene, tetrahydrothiophene, benzothiophene and their higher homologs and analogs. The hydrocarbon feedstocks suitable for use herein can also contain aromatics, which are typically present in an amount of from 10 to 60 wt. %, based on the weight of the hydrocarbon feedstock.

Exemplary hydrocarbon feedstocks suitable for treatment with the present disclosure are wax-containing feeds that boil in the lubricating oil range, typically having a 10% distillation point greater than 650° F. (343° C.) and an endpoint greater than 800° F. (426° C.), as measured by ASTM D86 or ASTM D2887. These hydrocarbon feedstocks can be derived from mineral sources, synthetic sources, or a mixture of the two. Non-limiting examples of suitable lubricating oil feedstocks include those derived from sources such as oils derived from solvent refining processes such as raffinates, partially solvent dewaxed oils, deasphalted oils, distillates, vacuum gas oils, coker gas oils, slack waxes, foots oils and the like, dewaxed oils, and Fischer-Tropsch waxes. These feedstocks can also have high contents of nitrogen and sulfur contaminants. Feedstocks containing up to about 0.25 wt. % of nitrogen, based on weight of the feed, and up to about 3.0 wt. % of sulfur, based on the weight of the feed, can be processed in the present process. Feeds having high wax content typically have high viscosity indexes of up to about 200 or more. Sulfur and nitrogen contents can be measured by ASTM D5453 and ASTM D4629, respectively.

Representative hydrotreating conditions include a temperature of from 302° F. to 752° F. (150° C. to 400° C.), e.g., from 392° F. to 752° F. (200° C. to 400° C.); a pressure of from 100 to 3000 psig (0.69 to 20.68 MPa), e.g., from 200 to 2000 psig (1.38 to 13.79 MPa); a liquid hourly space velocity (LHSV) of from 0.1 to 10 $h^{-1}$, e.g., from 0.5 to 5 $h^{-1}$; and a hydrogen treat gas rate of from 500 to 10000 SCF/B (89 to 1780 $m^3/m^3$), e.g., from 1000 to 5000 SCF/B (178 to 890 $m^3/m^3$).

The contacting of the hydrocarbon feedstock with the catalyst disclosed herein produces a hydrotreated effluent comprising at least a gaseous product and a hydrotreated hydrocarbon feedstock. The hydrotreated effluent is stripped to remove at least a portion of the gaseous product from the hydrotreated effluent. The means used to strip the hydrotreated effluent can be selected from any stripping method, process, or means known can be used. Non-limiting examples of suitable stripping methods, means, and processes include flash drums, fractionators, knock-out drums, steam stripping, etc.

EXAMPLES

The following illustrative examples are intended to be non-limiting.

Example 1

Preparation of Impregnation Solution 116.7 g of citric acid was added to 400 mL of water in a round bottom flask equipped with stirrer. 194.75 g of nickel carbonate (49% Ni) was added to the above solution. 189.34 g of phosphoric acid (85%) was then added slowly to the solution and the solution was heated to 150° F. Then, 475.95 g of molybdenum trioxide was added to the solution. The solution was heated to about 190° F. to 210° F. and held at that temperature range for at least 1.5 hours until the solution became clear. Once the solution became clear, it was cooled to below 120° F. and an additional 272.8 g of citric acid was added and the mixture was stirred until the solution became clear. The solution was diluted with deionized water to 1000 mL. The final $MoO_3$ concentration was 0.4750 g/mL of solution. Analysis of the resulting solution showed the following composition (metals expressed as the oxides): concentration in wt. % on a dry basis: NiO, 6.0; $P_2O_5$ 6.5; $MoO_3$, 25.0. The solution contained the following component ratio: 0.4 citric acid/(NiO+$MoO_3$) (mol/mol).

Example 2

Preparation of Partially Oxidized Catalyst Precursors

A hydrotreating catalyst made by the unique post-metal loading calcination method described herein (Catalyst 1) and a hydrotreating catalyst made using conventional calcination techniques (Catalyst 2) were prepared.

Catalysts 1 and 2 were prepared by impregnating silica-alumina (3 wt. % $SiO_2$) carriers using the metal impregnation solution prepared in Example 1. The carriers were impregnated by the incipient wetness method. The silica-alumina carrier had the following characteristics: a surface area 260 $m^2/g$ and a $N_2$ pore volume of 0.81 mL/g.

Catalysts 1 and 2 were prepared with the same metal loading but at different calcination temperatures in order to achieve different LOI.

For Catalyst 1, the precursor was heated in air at 320° F. (160° C.) for 10 minutes, ramped to 680° F. (360° C.) over 40 minutes, and held at 680° F. for 10 minutes to achieve a LOI of 5%.

For Catalyst 2, the precursor was heated in air at 320° F. (160° C.) for 10 minutes, ramped to 1000° F. (538° C.) over 40 minutes, and held at 1000° F. for 10 minutes to achieve a LOI of between 0-1%.

No evidence of the presence of $Ni_3C$ was observed in either Catalyst Precursor 1 or Catalyst Precursor 2, as determined by XPS.

The physical properties of Catalyst Precursors 1 and 2 are summarized in Table 1. The physical properties were measured after calcination at 1000° F. As shown, the only significant difference between the two catalysts is in the distribution of chemical states for carbon, where Catalyst Precursor 1 has a higher relative concentration of carbon-as-carboxy.

TABLE 1

Physical Properties of Catalyst Precursors 1 and 2

| | Catalyst Precursor 1 | Catalyst Precursor 2 (Conventional) |
|---|---|---|
| Surface Area, $m^2/g$ | 148 | 148 |
| $N_2$ Pore Volume, mL/g | 0.4 | 0.38 |
| LOI at 1020° F. | 5 | 1 |
| $MoO_3$, wt. % | 25.51 | 26.93 |
| NiO, wt. % | 6.37 | 6.64 |
| $P_2O_5$, wt. % | 7.14 | 6.9 |
| Carbon-as-Carboxy ($C_{carboxy}$), mol | 1.37 | 0.33 |
| Total Carbon ($C_{total}$), mol | 7.11 | 4.08 |
| $C_{carboxy}/C_{total}$ | 0.19 | 0.08 |

Example 3

Sulfidation of Partially Oxidized Catalyst Precursors

Catalyst Precursor 1 and Catalyst Precursor 2 were each sulfided to provide sulfided catalyst composition Catalyst 1 and Catalyst 2, respectively. The sulfiding procedures used are outlined below.

Liquid-Phase Sulfiding:

The catalyst precursor was dried in nitrogen at 150° F. and atmospheric pressure for 1 hour. The catalyst was wetted with 2.5 wt. % SULFRZOL® 54 sulfiding agent (Lubrizol)/straight run (SR) diesel in hydrogen at 250° F. and 500 psig for 1 hour. Low temperature sulfiding was conducted by contacting the catalyst with 2.5 wt. % SULFRZOL® 54/SR diesel at 480° F., 500 psig and 1 $h^{-1}$ LHSV for 30 hours. High temperature sulfiding was conducted by contacting the catalyst with 2.5 wt. % SULFRZOL® 54/SR diesel at 650° F., 2300 psig and 2 $h^{-1}$ LHSV for 8 hours. The reactor temperature was dropped to 450° F. with 2.5 wt. % SULFRZOL® 54/SR diesel and held at this temperature for 2 hours. A SR diesel line-out was held at 680° F., 2300 psig and 2.0 $h^{-1}$ for 3 days. The run feed was fed into the unit and the temperature was ramped up to unit run temperature.

Gas-Phase Sulfiding:

The catalyst precursor was dried in nitrogen at 150° F. and atmospheric pressure for 1 hour followed by drying in nitrogen at 450° F. and atmospheric pressure for 0.5 hours. Low temperature sulfiding was conducted by contacting the catalyst with 6 wt. % dimethyl disulfide (DMDS)/heptane in hydrogen at 450° F., 500 psig and 4.0 $h^{-1}$ for 4 hours. High temperature sulfiding was conducted by contacting the catalyst with 6 wt. % DMDS/heptane in hydrogen at 600° F., 800 psig and 4.0 $h^{-1}$ for 4 hours. The reactor temperature was dropped to 450° F. with 6 wt. % DMDS/heptane and held at this temperature for 2 hours. A SR diesel line-out was held at 680° F., 2300 psig and 2.0 $h^{-1}$ for 3 days. The run feed was fed into the unit and the temperature was ramped up to unit run temperature.

Example 4

HDS/HDN Activity of VGO Using Catalysts 1 and 2

Catalysts 1 and 2 were employed to hydrotreat a VGO having the properties listed in Table 2, under the process conditions listed in Table 3 below.

TABLE 2

| Properties of VGO Feed | |
|---|---|
| API | 17.2 |
| S, wt. % | 2.54 |
| N, ppm | 2484 |
| H wt. % by NMR | 11.49 |
| Metal Content by ICP | |
| Fe, ppm | 13.0 |
| Na, ppm | 2.3 |
| Ni, ppm | 1.2 |
| V, ppm | 5.7 |
| SimDist (wt. %), ° F. | |
| 0.5 | 472 |
| 5 | 628 |
| 50 | 820 |
| 95 | 988 |
| EP | 1021 |

TABLE 3

| Hydrotreating Process Conditions | |
|---|---|
| Reaction Temperature, ° F. | 740 |
| Total Pressure, psig | 2300 |
| $H_2$/Oil, SCF/B | 5500 |
| LHSV, $h^{-1}$ | 1.0 |

The hydrotreating test results, expressed as relative volume amounts (RVA), using catalysts sulfided by both liquid- and gas-phase sulfiding, are outlined below in Tables 4 and 5 below, respectively.

TABLE 4

| HDS/HDN Activity with Catalysts Sulfided by Liquid-Phase Sulfiding | | |
|---|---|---|
| | Catalyst 1 | Catalyst 2 (Conventional) |
| RVA HDN | 116 | 97 |
| RVA HDS | 117 | 100 |

TABLE 5

| HDS/HDN Activity with Catalysts Sulfided by Gas-Phase Sulfiding | | |
|---|---|---|
| | Catalyst 1 | Catalyst 2 (Conventional) |
| RVA HDN | 112 | 97 |
| RVA HDS | 112 | 100 |

As shown in Tables 4 and 5, the HDN/HDS activity of Catalyst 1 is significantly improved over conventional Catalyst 2.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for preparing a catalyst precursor composition suitable for hydrotreating hydrocarbon feedstocks, the method comprising:
    (a) impregnating an inorganic catalyst support, the support comprising a porous inorganic refractory selected from the group consisting of silica, alumina, alumina-silica, and crystalline silica-alumina with an aqueous solution containing (i) a salt of a Group VIB metal selected from Mo and W, (ii) a salt of a Group VIII metal selected from Co and Ni, and (iii) an organic acid wherein the organic acid is a hydroxycarboxylic acid selected from the group consisting of glycolic acid, lactic acid, glyceric acid, gluconic acid, malic acid, tartaric acid, mucic acid, and citric acid;
    (b) drying the impregnated catalyst support, thereby resulting in a metal-organic component on a dried catalyst precursor;
    (c) calcining the dried catalyst precursor in an oxygen-containing atmosphere for a time and temperature sufficient to oxidize some but not all of the organic portion of the metal-organic component, thereby resulting in a partially oxidized catalyst precursor having:
    (i) a loss-on-ignition of greater than 1 wt. % and up to 10 wt %; and
    (ii) a carbon-as-carboxy to total residual carbon ratio ($C_{carboxy}/C_{total}$) of from 0.10 to 0.19 and determined by X-ray photoelectron spectroscopy; and
    wherein: (1) loss-on-ignition is determined using a test conducted by heating a sample of the partially oxidized catalyst precursor in an oxygen-containing atmosphere for 1 hour @ 1020° F. (549° C.) and measuring weight loss alter such heating; and (2) calcining is carried out for a time of from 1 minute to 1 hour at a temperature of 350° C. to 500° C.

2. The method of claim 1, wherein the inorganic catalyst support is selected from the group consisting of alumina, silica, and alumina-silica.

3. The method of claim 1, wherein the aqueous solution further comprises at least one phosphorus-containing acidic component.

4. The method of claim 1, wherein the calcining is carried out at a temperature of from 360° C. to 500° C.

5. The method of claim 1, wherein the calcining is carried out at a time of from 5 minutes to 1 hour.

6. The method of claim 1, wherein the partially oxidized catalyst precursor has a loss-on-ignition of greater than 1 wt. % and up to 8 wt. %.

7. The method of claim 1 comprising:
    (d) sulfiding the partially oxidized catalyst precursor at sulfiding conditions in the presence of a sulfiding agent, thereby resulting in a sulfided catalyst composition.

* * * * *